United States Patent
Kim et al.

(10) Patent No.: US 9,734,330 B2
(45) Date of Patent: Aug. 15, 2017

(54) INSPECTION AND RECOVERY METHOD AND APPARATUS FOR HANDLING VIRTUAL MACHINE VULNERABILITY

(71) Applicant: ELECTRONICS AND TELECOMMUNICATIONS RESEARCH INSTITUTE, Daejeon (KR)

(72) Inventors: Sung-Jin Kim, Daejeon (KR); ByungJoon Kim, Daejeon (KR); ChulWoo Lee, Daejeon (KR); HyoungChun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 14/791,729

(22) Filed: Jul. 6, 2015

(65) Prior Publication Data
US 2016/0092679 A1    Mar. 31, 2016

(30) Foreign Application Priority Data
Sep. 25, 2014 (KR) .................. 10-2014-0128022

(51) Int. Cl.
G06F 21/57 (2013.01)
G06F 21/55 (2013.01)
G06F 21/53 (2013.01)

(52) U.S. Cl.
CPC ............ G06F 21/552 (2013.01); G06F 21/53 (2013.01)

(58) Field of Classification Search
CPC .......... G06F 21/00; G06F 21/44; G06F 21/50; G06F 21/51; G06F 21/53; G06F 21/55;
(Continued)

(56) References Cited

U.S. PATENT DOCUMENTS 7,886,294 B2 * 2/2011 Dostert ................ G06F 9/544
  707/814
8,572,739 B1 * 10/2013 Cruz ..................... G06F 21/566
  726/22
(Continued)

FOREIGN PATENT DOCUMENTS

JP    2012-003651 A    1/2012
JP    2012-509516 A    4/2012
KR    10-2012-0035081 A    4/2012

OTHER PUBLICATIONS

Raydel Montesino et al., "Information security automation: how far can we go?" Sixth International Conference on Availability, Reliability and Security, 2011.

*Primary Examiner* — Eric W Shepperd
(74) *Attorney, Agent, or Firm* — LRK Patent Law Firm (57) ABSTRACT

An inspection and recovery method and apparatus for handling virtual machine vulnerability, which inspect the security status of a virtual machine in a hypervisor domain, and recover a main system file or limit the use of a virtual machine suspected of being damaged due to hacking depending on the results of inspection, thus providing a secure virtual machine use environment for cloud computing. In the presented method, collection target information and inspection criteria including vulnerability inspection criteria, recovery criteria, and hacking damage criteria are updated. Then, the collection target information is collected from the virtual disk and virtual memory of each virtual machine. Vulnerability is inspected in conformity with the inspection criteria, based on the collected information. A damaged main system file depending on inspection results is recovered based on recovery criteria.

14 Claims, 4 Drawing Sheets

(58) Field of Classification Search
CPC ...... G06F 21/552; G06F 21/554; G06F 21/56;
G06F 21/561; G06F 21/57; G06F 21/577
See application file for complete search history.

(56) References Cited

U.S. PATENT DOCUMENTS

| | | | |
|---|---|---|---|
| 8,984,345 B2 | 3/2015 | Lee et al. | |
| 2008/0098364 A1* | 4/2008 | Gray-Donald | G06F 11/3476 717/130 |
| 2008/0181227 A1* | 7/2008 | Todd | H04L 63/1416 370/392 |
| 2010/0257608 A1* | 10/2010 | Jeong | G06F 21/566 726/24 |
| 2011/0047340 A1* | 2/2011 | Olson | G06F 11/1456 711/162 |
| 2012/0011397 A1* | 1/2012 | Murakami | G06F 11/0712 714/15 |
| 2012/0159240 A1 | 6/2012 | Srivastava et al. | |
| 2012/0287931 A1* | 11/2012 | Kidambi | H04L 49/602 370/392 |
| 2013/0111591 A1* | 5/2013 | Topan | G06F 21/563 726/24 |
| 2013/0152076 A1* | 6/2013 | Patel | G06F 9/45558 718/1 |
| 2014/0059688 A1* | 2/2014 | Margalit | G06F 21/561 726/24 |
| 2014/0068613 A1* | 3/2014 | Iriguchi | G06F 9/45545 718/1 |
| 2014/0189873 A1 | 7/2014 | Elder et al. | |
| 2014/0359619 A1* | 12/2014 | Park | G06F 9/45558 718/1 |
| 2015/0371039 A1* | 12/2015 | Suominen | G06F 21/52 726/23 |

\* cited by examiner

INSPECTION AND RECOVERY METHOD AND APPARATUS FOR HANDLING VIRTUAL MACHINE VULNERABILITY

CROSS REFERENCE TO RELATED APPLICATION

This application claims the benefit of Korean Patent Application No. 10-2014-0128022, filed Sep. 25, 2014, which is hereby incorporated by reference in its entirety into this application.

BACKGROUND OF THE INVENTION

1. Technical Field

The present invention generally relates to an inspection and recovery apparatus and method for handling virtual machine vulnerability and, more particularly, to a method and apparatus that automatically inspect the vulnerability of a virtual machine and recover damaged main system files in the hypervisor domain of a cloud computing environment.

2. Description of the Related Art

Recently, to cope with hacking threats, the installation of an antivirus program and a firewall has been generalized even in a virtual machine environment.

However, such security software does not desirably perform significant security check tasks that are to be performed after being installed, for example, the maintenance of latest security patches for software itself or other applications and the configuration and management of operating system (OS) security. The reason for this is that security software is functionally limited and it is difficult for normal users to acquire knowledge required to manually perform such tasks.

Therefore, there is required an inspection and recovery automation system for virtual machine security, which can provide a secure virtual machine use environment and cope with hacking threats in cloud computing.

As a method of automating the security check of a virtual machine, a host vulnerability automatic inspection agent may be separately installed and operated in each virtual machine. Such a host vulnerability automatic inspection agent is advantageous in that inspections, such as the maintenance of the latest security patches of an OS and applications and the configuration of major security, may be automated.

However, since an agent must be installed in each virtual machine and is executed at the application level of the virtual machine, there is the concern that the results of inspection may be forged by a malicious user or malicious code.

As related preceding technology, U.S. Patent Application Publication No 2014 -0189873 discloses technology related to an automation system, which collects the configuration information of a host, analyzes the collected information based on information stored in a vulnerability database (DB), and calculates vulnerability scores.

As another related preceding technology, technology for presenting the results of analyzing the present state of information security management automation from various angles was published in the paper entitled "Information Security Automation: How Far Can We Go?" (Montesino, R. and S. Fenz) in IEEE Availability, Reliability and Security p 280-p 285, 22-26 Aug. 2011.

SUMMARY OF THE INVENTION

Accordingly, the present invention has been made keeping in mind the above problems occurring in the prior art, and an object of the present invention is to provide an inspection and recovery method and apparatus for handling virtual machine vulnerability, which inspect the security status of a virtual machine in a hypervisor domain, and recover a main system, file or limit the use of a virtual machine suspected of being damaged due to hacking depending on the results of inspection, thus providing a secure virtual machine use environment for cloud computing.

In accordance with an aspect of the present invention to accomplish the above object, there is provided an inspection and recovery method for handling virtual machine vulnerability, including collecting, by an information collection module unit, collection target information from each of virtual machines; inspecting, by a vulnerability inspection module unit, vulnerability of a given virtual machine in conformity with preset vulnerability inspection criteria, based on the collected information; and recovering, by a recovery module unit, a main system file damaged in the virtual machine depending on results of vulnerability inspection, based on preset recovery criteria.

Collecting the collection target information may include collecting main file information of a virtual disk image of each virtual machine via a virtual disk read/write Application Programming Interface (API).

Collecting the collection target information may include collecting information that can be obtained from virtual memory of each virtual machine via a virtual memory read API and that includes process execution information, kernel memory information, and network port status information of the virtual machine.

Inspecting the vulnerability may include performing one or more of an antivirus inspection, a main system file forgery/non-forgery inspection, a user area process status inspection, a kernel area memory forgery/non-forgery inspection, a present network resource usage state inspection, a software configuration and patch inspection, and an operating system configuration and patch inspection.

Recovering the main system file may include recovering the damaged main system file via a virtual disk read/write API.

The inspection and recovery method may further include, logging, by a logging module unit, the results of the vulnerability inspection.

The inspection and recovery method may further include limiting, by a virtual machine control module unit, use of a system by a virtual machine suspected of being damaged due to hacking depending on preset hacking damage criteria.

The hacking damage criteria may include forgery of a main system file and injection of a suspicious Dynamic Link Library (DLL) file into a major process.

The vulnerability inspection criteria may be divided into software version management status, patch application status, operating system configuration status, network connection status, and process execution status, depending on attributes.

The collection target information may include main configuration files of registry and an operating system, an application configuration file, network connection information, and process execution information.

In accordance with another aspect of the present invention to accomplish the above object, there is provided an inspection and recovery apparatus for handling virtual machine vulnerability, including an information collection module unit for collecting collection target information from each of the virtual machines; a vulnerability inspection module unit for inspecting vulnerability of a given virtual machine in conformity with preset vulnerability inspection criteria, based on the collected information; and a recovery module unit for recovering a main system file damaged in the virtual machine depending on results of vulnerability inspection by the vulnerability inspection module unit, based on preset recovery criteria.

The information collection module unit may collect main file information of a virtual disk image of each virtual machine via a virtual disk read/write Application Programming Interface (API).

The information collection module unit may collect information that can be obtained from virtual memory of each virtual machine via a virtual memory read API and that includes process execution information, kernel memory information, and network port status information of the virtual machine.

The vulnerability inspection module unit may perform one or more of an antivirus inspection, a main system file forgery/non-forgery inspection, a user area process status inspection, a kernel area memory forgery/non-forgery inspection, a present network resource usage state inspection, a software configuration and patch inspection, and an operating system configuration and patch inspection.

The recovery module unit may recover the damaged main system file via a virtual disk read/write API.

The inspection and recovery apparatus may further include a logging module unit for logging the results of the vulnerability inspection by the vulnerability inspection module unit.

The inspection and recovery apparatus may further include a virtual machine control module unit for limiting use of a system by a virtual machine suspected of being damaged due to hacking depending on preset hacking damage criteria.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 1:
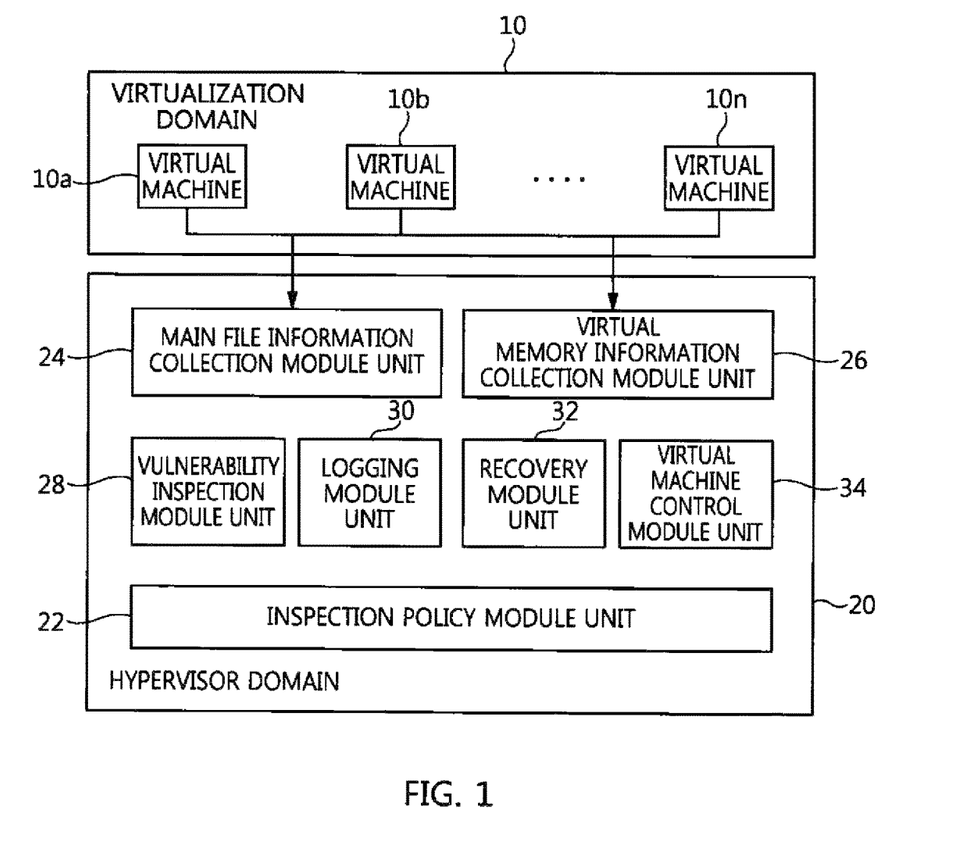
FIG. 1 is a diagram showing the configuration of an inspection and recovery apparatus for handling virtual machine vulnerability according to an embodiment of the present invention.
Figure 2:
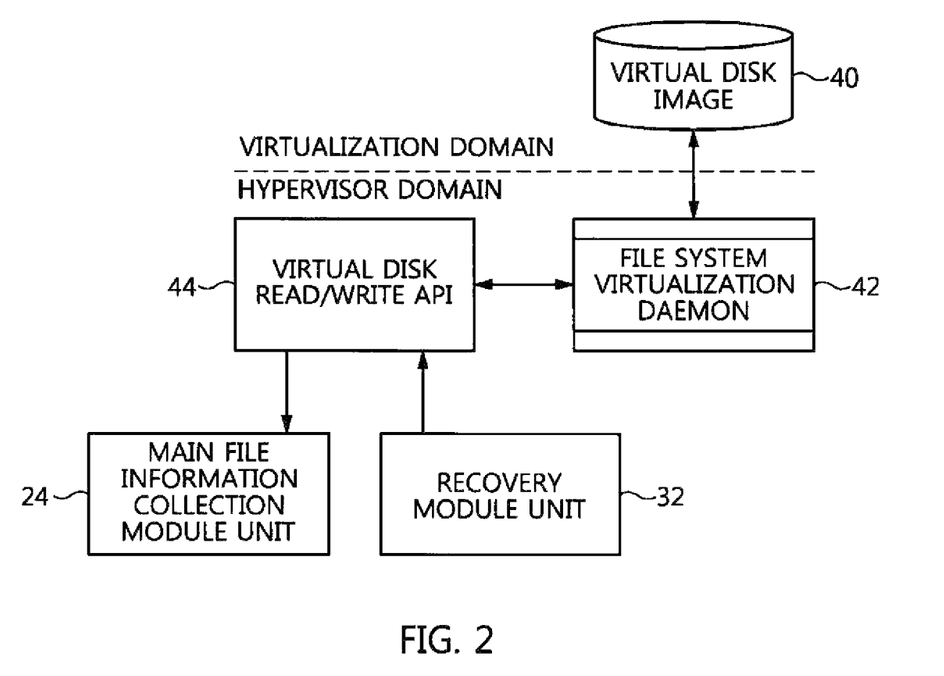
FIG. 2 is a diagram showing a scheme for interworking between a hypervisor-based virtual disk read/write API, a main file information collection module unit, and a recovery module unit according to the present invention.
Figure 3:
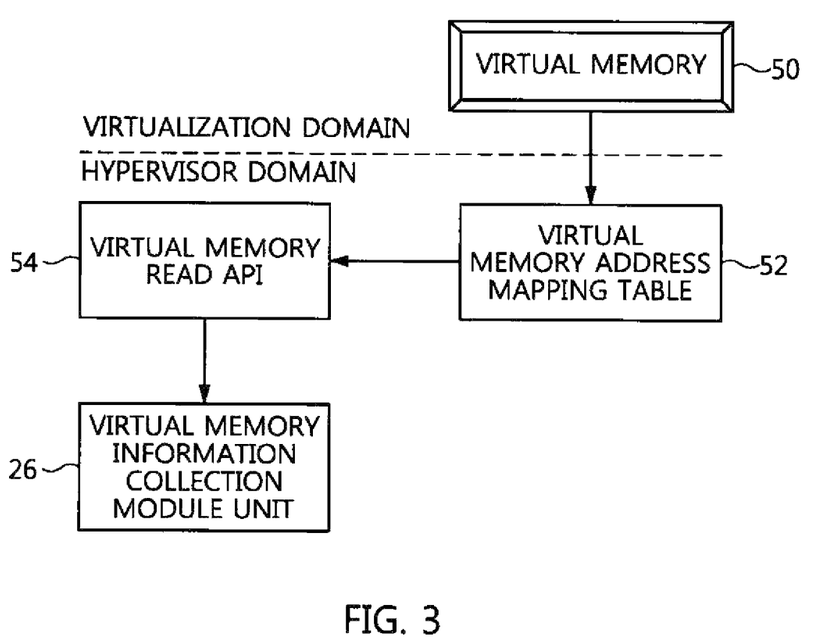
FIG. 3 is a diagram showing a scheme for interworking between a hypervisor-based virtual memory read API and a virtual memory information collection module unit according to an embodiment of the present invention.

FIG. 1 is a diagram showing the configuration of an inspection and recovery apparatus for handling virtual machine vulnerability according to an embodiment of the present invention, FIG. 2 is a diagram showing a scheme for interworking between a hypervisor-based virtual disk read/write API, a main file information collection module unit, and a recovery module unit according to the present invention, and FIG. 3 is a diagram showing a scheme for interworking between a hypervisor-based virtual memory read API and a virtual memory information collection module unit according to an embodiment of the present invention.

An inspection and recovery apparatus 20 for handling virtual machine vulnerability according to an embodiment of the present invention is operated in the hypervisor domain of a cloud computing environment rather than in a virtualization domain. Here, a hypervisor may be regarded as a software virtualization platform capable of simultaneously running a plurality of operating systems (OSs) on a single host computer. A hypervisor is also referred to as a virtual machine monitor. Cloud computing may be regarded as technology for processing information using a remote computer connected to the Internet rather than a designated user computer.

The inspection and recovery apparatus 20 for handling virtual machine vulnerability according to an embodiment of the present invention includes an inspection policy module unit 22, a main file information collection module unit 24, a virtual memory information collection module unit 26, a vulnerability inspection module unit 28, a logging module unit 30, a recovery module unit 32, and a virtual machine control module unit 34. Here, the term 'module' may be omitted from each of the names of the components 22, 24, 26, 28, 30, 32, and 34.

The inspection policy module unit 22 updates vulnerability inspection criteria, recovery criteria, collection target information, and hacking damage criteria, and provides an inspection policy and a recovery policy based on the updated criteria and information. In other words, the inspection policy module unit 22 may be regarded as providing a collection target information list, the latest inspection criteria (i.e., vulnerability inspection criteria and recovery criteria), and hacking damage criteria to the hypervisor-based inspection and recovery apparatus 20 for handling virtual machine vulnerability.

Here, the vulnerability inspection criteria may be divided into software version management status, patch application status, OS configuration status, network connection status, and process execution status depending on attributes. Consequently, vulnerability inspection criteria may differ for respective virtual machines. Further, the collection target information may be registry and OS main configuration files, application configuration files, network connection information, process execution information, etc. Here, the vulnerability inspection criteria and the collection target information may be flexibly changed in response to the request of an institution that adopts the criteria.

Meanwhile, the vulnerability inspection criteria, the recovery criteria, and the hacking damage criteria may be collectively designated as inspection criteria. It may be considered that an inspection policy is established in conformity with such inspection criteria.

The main file information collection module unit 24 periodically collects the collection target file information of virtual disk images in a hypervisor domain. Therefore, the main file information collection module unit 24 may be regarded as a hypervisor-based main file information collection module unit.

The main file information collection module unit 24 collects main file information, such as the system files and registry of the virtual disk images 40 (see FIG. 2) of respective virtual machines 10 (including 10a to 10n), via a hypervisor-based virtual disk read/write Application Programming Interface (API) 44 (see FIG. 2) at intervals of a time period set in the hypervisor domain. In this case, the virtual disk read/write API 44 is implemented in the hypervisor domain and is executed on a hypervisor platform having root authority. Also, a series of APIs for periodically collecting the main files of virtual disks may be, implemented in the form of a script. In FIG. 2, the file system virtualization daemon 42 of a virtualization daemon may access each virtual disk. The file system virtualization daemon 42 may download a specific file present on a virtual disk or upload a specific file to the virtual disk in response to a call from the virtual disk read/write API 44.

In other words, the main file information collection module unit 24 may be regarded as collecting collection target file information presented by the inspection policy module unit 22 in the hypervisor domain from the virtual disk using the hypervisor-based virtual disk read/write API 44.

The virtual memory information collection module unit 26 periodically collects virtual memory information in the hypervisor domain. Therefore, the virtual memory information collection module unit 26 may be regarded as a hypervisor-based virtual memory information collection module unit.

The virtual memory information collection module unit 26 collects the process execution information, kernel memory information, network port status information, etc. of the virtual machines 10a to 10n, which can be acquired from virtual memory 50, via a hypervisor-based virtual memory read API 54 (see FIG. 3). In this case, the virtual memory read API 54 is implemented in the hypervisor domain and is executed on the hypervisor platform having root authority. Further, a series of APIs for periodically collecting the main information of the virtual memory 50 may be implemented in the form of a script. In FIG. 3, the virtual memory read API 54 may identify the location of the virtual memory of a specific virtual machine (e.g., any one of 10a to 10n) via a virtual memory address mapping table 52, and may fetch the entire or partial information of the virtual memory.

In other words, the virtual memory information collection module unit 26 may be regarded as collecting collection target memory information, presented by the inspection policy module unit 22 in the hypervisor domain, from the virtual memory 50 of the virtual machine using the hypervisor-based virtual memory read API 54.

Although not shown in the drawing, the above-described main file information collection module unit 24 and virtual memory information collection module unit 26 may be collectively designated as an information collection module unit.

The vulnerability inspection module unit 28 inspects vulnerability in conformity with the policy of the inspection policy module unit 22, based on the information collected by the main file information collection module unit 24 and the virtual memory information collection module unit 26.

In detail, the vulnerability inspection module unit 28 performs vulnerability inspection for each virtual machine in conformity with the inspection criteria of the inspection policy module unit 22. In this case, the present invention may perform, as an embodiment of vulnerability inspection, any of various inspections such as an antivirus inspection, a main system file forgery/non-forgery inspection, a user area process status inspection, a kernel area memory forgery/non-forgery inspection, a present network resource usage state inspection, a software configuration and patch inspection, and an OS configuration and patch inspection.

The logging module unit 30 logs the results of inspection by the vulnerability inspection module unit 28.

That is, the logging module unit 30 may record the inspection results for respective virtual machines in a storage medium (not shown), thus allowing a system operator to use the recorded inspection results upon notifying virtual machine users of the inspection results.

In other words, the logging module unit 30 may be regarded as providing the inspection results from the vulnerability inspection module unit 28 to the outside of the apparatus and processing the statistical information thereof.

The recovery module unit 32 recovers forged main system files.

More specifically, the recovery module unit 32 recovers the main system files via the virtual disk read/write API 44 (see FIG. 2). The virtual disk read/write API 44 is implemented in the hypervisor domain and is executed on the hypervisor platform having root authority.

In other words, the recovery module unit 32 may be regarded as restoring forged main system files based on the hacking damage criteria of the inspection policy module unit 22 to original files so that the forged main system files are recovered based on the recovery criteria.

Also, the original main system files of the respective virtual machines 10a to 10n may be backed up to the storage medium of the hypervisor platform. Hence, when the system files are recovered, the recovery module unit 32 may refer to the storage medium.

The virtual machine control module unit 34 limits the use of the system by virtual machines (one or more of 10a to 10n) suspected of being damaged due to hacking, depending on the hacking damage criteria of the inspection policy module unit 22. Here, the hacking damage criteria are presented by the inspection policy module unit 22. The forgery of main system files, the injection of a suspicious Dynamic Link Library (DLL) file into a major process, etc. may be the hacking damage criteria. Further, the limitation of system use may be set in consideration of prohibition of system use or network blocking depending on the operating policy, and may be implemented in the form of a script or the like by a hypervisor management API (not shown).

As described above, the present invention may automatically inspect and recover the security status of the virtual machines 10a to 10n in the hypervisor domain, without installing separate inspection software in the respective virtual machines 10a to 10n, thus providing a secure virtual machine use environment.

Figure 4:
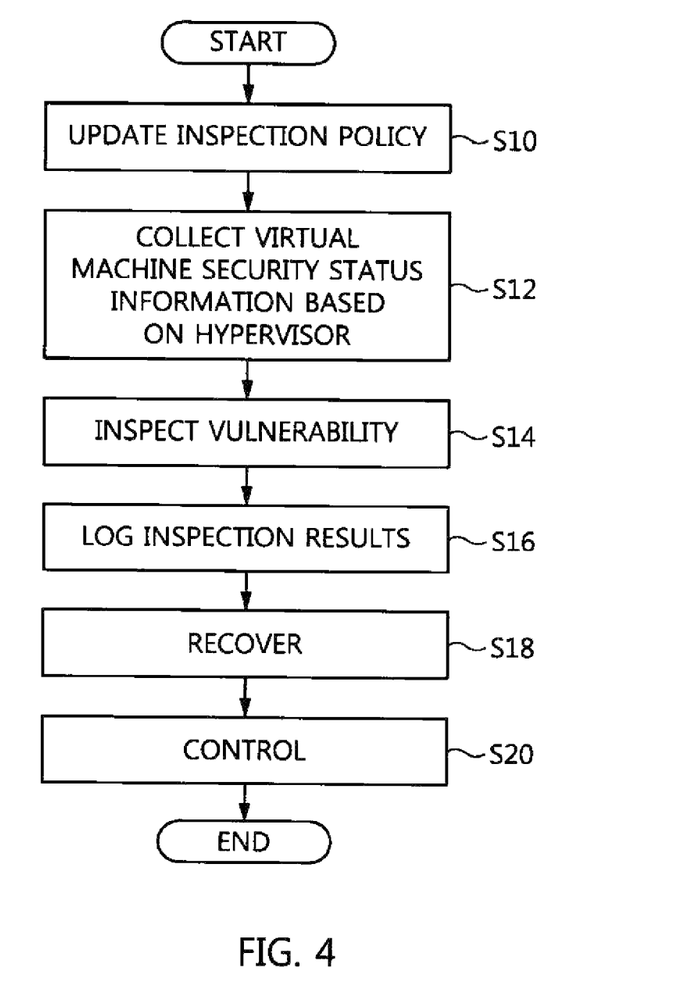
FIG. 4 is a flowchart showing an inspection and recovery method for handling virtual machine vulnerability according to an embodiment of the present invention.

FIG. 4 is a flowchart showing an inspection and recovery method for handling virtual machine vulnerability according to an embodiment of the present invention. A series of operation procedures illustrated in the flowchart may be performed at regular periods according to the set time, and the entire process of the method may be automated.

First, the inspection policy module unit 22 updates vulnerability inspection criteria, recovery criteria, collection target information, and hacking damage criteria, and incorporates the updated criteria and information into the policies of the vulnerability inspection module unit 28 and the recovery module unit 32 at step S10.

The main file information collection module unit 24 and the virtual memory information collection module unit 26 collect main file information and virtual memory information, respectively, in the hypervisor domain at step S12.

The vulnerability inspection module unit 28 inspects vulnerability in conformity with the inspection policy, based on the information collected by the main file information collection module unit 24 and the virtual memory information collection module unit 26 at step S14.

Further, the logging module unit 30 logs the results of inspection by the vulnerability inspection module unit 28 at step S16. In other words, the logging module unit 30 records the inspection results for respective virtual machines in a storage medium.

Then, the recovery module unit 32 recovers damaged main system files depending on the inspection results (i.e., hacking damage criteria), based on the recovery criteria or recovery policy at step S18.

Furthermore, the virtual machine control module unit 34 limits the use of the system by virtual machines (one or more of 10a to 10n) suspected of being damaged due to hacking depending on the inspection criteria (i.e., hacking damage criteria) of the inspection policy module unit 22 at step S20.

In accordance with the present invention having the above configuration, each virtual machine is automatically inspected in a hypervisor domain, and a main system file is recovered or the use of a virtual machine is limited when the virtual machine is suspected of being damaged due to hacking, thus providing a secure virtual machine use environment.

Further, the present invention is advantageous in that collection target information for an inspection policy, inspection criteria, and, hacking damage criteria may be changed in response to the request of institutions that adopt the policy and the criteria, thus obtaining flexibility in inspection and recovery tasks.

Furthermore, the present invention is advantageous in that all steps of the present invention are performed in a hypervisor domain, so that the scheme of the present invention is more secure against threats such as the forgery of inspection results than an existing scheme in which information is collected or inspected at the level of the application of each virtual machine.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A computer implemented inspection and recovery method for handling virtual machine vulnerability, comprising:
   collecting, by an information collection module unit, collection target information from each of a set of virtual machines;
   inspecting, by a vulnerability inspection module unit, vulnerability of a given virtual machine in conformity with preset vulnerability inspection criteria, based on the collected target information, and determining whether a main system file has been damaged; and
   limiting, by a virtual machine control module unit, use of a system by the virtual machine suspected of being damaged due to hacking, depending on preset hacking damage criteria, wherein the preset hacking damage criteria include forgery of a main system file and injection of a suspicious Dynamic Link Library (DLL) file into a main process; and
   recovering, by a recovery module unit, a damaged main system file in the given virtual machine to an original main system file depending on results of the vulnerability inspection, based on preset recovery criteria.

2. The computer implemented inspection and recovery method of claim 1, wherein collecting the collection target information comprises collecting main file information of a virtual disk image of each virtual machine of the set of virtual machines via a virtual disk read/write Application Programming Interface (API).

3. The computer implemented inspection and recovery method of claim 1, wherein collecting the collection target information comprises collecting information that can be obtained from virtual memory of each virtual machine of the set of virtual machines via a virtual memory read API and that includes process execution information, kernel memory information, and network port status information of the virtual machine.

4. The computer implemented inspection and recovery method of claim 1, wherein inspecting the vulnerability comprises performing one or more of an antivirus inspection, a main system file forgery/non-forgery inspection, a user area process status inspection, a kernel area memory forgery/non-forgery inspection, a present network resource usage state inspection, a software configuration and patch inspection, and an operating system configuration and patch inspection.

5. The computer implemented inspection and recovery method of claim 1, wherein recovering the damaged main system file comprises recovering the damaged main system file via a virtual disk read/write API.

6. The computer implemented inspection and recovery method of claim 1, further comprising, logging, by a logging module unit, the results of the vulnerability inspection.

7. The computer implemented inspection and recovery method of claim 1, wherein the vulnerability inspection criteria are divided into software version management status, patch application status, operating system configuration status, network connection status, and process execution status, depending on attributes.

8. The computer implemented inspection and recovery method of claim 1, wherein the collection target information includes main configuration files of registry and an operating system, an application configuration file, network connection information, and process execution information.

9. An inspection and recovery apparatus for handling virtual machine vulnerability, comprising:
 a remote computer comprising one or more units which are executed by a processor, the one or more units comprising:
  an information collection module unit configured to collect collection target information from each of a set of virtual machines;
  a vulnerability inspection module unit configured to inspect vulnerability of a given virtual machine in conformity with preset vulnerability inspection criteria, based on the collected target information, and configured to determine whether a main system file has been damaged;
  a virtual machine control module unit configured to limit use of a system by the virtual machine suspected of being damaged due to hacking, depending on preset hacking damage criteria, wherein the preset hacking damage criteria include forgery of a main system file and injection of a suspicious Dynamic Link Library (DLL) file into a main process; and
  a recovery module unit configured to recover a damaged main system file in the given virtual machine to an original main system file depending on results of the vulnerability inspection by the vulnerability inspection module unit, based on preset recovery criteria.

10. The inspection and recovery apparatus of claim 9, wherein the information collection module unit collects main file information of a virtual disk image of each virtual machine of the set of virtual machines via a virtual disk read/write Application Programming Interface (API).

11. The inspection and recovery apparatus of claim 9, wherein the information collection module unit collects information that can be obtained from virtual memory of each virtual machine of the set of virtual machines via a virtual memory read API and that includes process execution information, kernel memory information, and network port status information of the virtual machine.

12. The inspection and recovery apparatus of claim 9, wherein the vulnerability inspection module unit performs one or more of an antivirus inspection, a main system file forgery/non-forgery inspection, a user area process status inspection, a kernel area memory forgery/non-forgery inspection, a present network resource usage state inspection, a software configuration and patch inspection, and an operating system configuration and patch inspection.

13. The inspection and recovery apparatus of claim 9, wherein the recovery module unit recovers the damaged main system file via a virtual disk read/write API.

14. The inspection and recovery apparatus of claim 9, further comprising a logging module unit configured to log the results of the vulnerability inspection by the vulnerability inspection module unit.

* * * * *